(12) United States Patent
Mainwaring et al.

(10) Patent No.: US 6,351,271 B1
(45) Date of Patent: Feb. 26, 2002

(54) METHOD AND APPARATUS FOR SENDING AND RECEIVING LIGHTWEIGHT MESSAGES

(75) Inventors: Scott D. Mainwaring; Debby Hindus, both of San Francisco, CA (US); Christian Mogensen, Oslo (NO); Colin Burns, London (GB)

(73) Assignee: Interval Research Corporation, Palo Alto, CA (US)

( * ) Notice: Subject to any disclaimer, the term of this patent is extended or adjusted under 35 U.S.C. 154(b) by 0 days.

(21) Appl. No.: 09/169,750

(22) Filed: Oct. 9, 1998

Related U.S. Application Data

(60) Provisional application No. 60/062,144, filed on Oct. 9, 1997, and provisional application No. 60/001,875, filed on Oct. 8, 1998.

(51) Int. Cl.$^7$ ................................................. G06F 7/00

(52) U.S. Cl. ........................................ 345/744; 707/12

(58) Field of Search ................................. 707/9, 10, 11, 707/12; 345/330, 331, 332, 335, 753, 751, 759, 744, 853

(56) References Cited

U.S. PATENT DOCUMENTS

| | | | |
|---|---|---|---|
| 4,172,969 | A | 10/1979 | Levine et al. |
| 4,536,887 | A | 8/1985 | Kaneda et al. |
| 4,780,883 | A | 10/1988 | O'Connor et al. |

(List continued on next page.)

FOREIGN PATENT DOCUMENTS

| | | | |
|---|---|---|---|
| EP | 0 730 365 A2 | 9/1996 | ............ H04M/3/56 |

OTHER PUBLICATIONS

Sony Electronics, Inc., *How the Cyberframe Viewer Works*, http://www.sel.sony.com, 1999.

Sony Electronics, Inc., *Cyberframe Models*, http://www.sel.sony.com, 1999.

BinaryLabs, Inc., http://www.peoplepost.com.

PhoneMate, Answering Machine & Cordless Telephone Easy To Use Owner's Guide, Dec. 1993.

*Primary Examiner*—Cao H. Nguyen
(74) *Attorney, Agent, or Firm*—Oppenheimer Wolff & Donnelly LLP

(57) ABSTRACT

The present invention teaches methods and apparatus for social interaction allowing users to communicate at their leisure (asynchronously or "semi-synchronously") by providing simple, flexible access to a persistent, shared space. For example, an electronic communication system according to one embodiment provides a shared persistent data space to a plurality of clients. This system comprises a server and at least two input/display units (IDUS) which clients use to access shared persistent data in the form of group boards. The group boards store discrete notes in a group database made accessible to all members of the group. In order to allow clients to select a desired group, each IDU includes an input detection space operable to receive user input indicative of a request to access a specific group. The input detection space can take on many forms such as electromechanical buttons, touch or pressure sensitive devices, a digital inking device, a token input device (tokens each have some identification in the form of circuitry or such), or a voice command device. In order to allow clients to enter data into the board group database, each IDU includes a note data input device. Like the input detection space, a wide variety of note data input devices are contemplated. For example, a touch, stylus or pressure sensitive device would be suitable. A scanning device also works well, creating a unique persistent space wherein users can exchange discrete note messages of a variety of forms such as handwritten notes and photographs.

73 Claims, 11 Drawing Sheets

U.S. PATENT DOCUMENTS

| | | |
|---|---|---|
| 4,866,765 A | 9/1989 | Yang |
| 4,882,726 A | 11/1989 | Lang et al. |
| 4,887,204 A | 12/1989 | Johnson et al. |
| 4,893,305 A | 1/1990 | Fernandez et al. |
| 4,940,963 A | 7/1990 | Gutman et al. |
| 5,231,649 A | 7/1993 | Duncanson |
| 5,267,323 A | 11/1993 | Kimura |
| 5,335,011 A | 8/1994 | Addeo et al. |
| 5,360,446 A | 11/1994 | Kennedy |
| 5,388,196 A * | 2/1995 | Pajak et al. ................. 345/153 |
| 5,459,458 A | 10/1995 | Richardson et al. |
| 5,481,610 A | 1/1996 | Doiron et al. |
| 5,487,181 A | 1/1996 | Dailey et al. |
| 5,590,396 A | 12/1996 | Henry |
| 5,664,015 A | 9/1997 | Ford et al. |
| 5,666,215 A | 9/1997 | Fredlund et al. |
| 5,765,151 A | 6/1998 | Senator |
| 5,790,138 A | 8/1998 | Hsu |
| 5,826,253 A | 10/1998 | Bredenberg |
| 5,941,947 A * | 8/1999 | Brown et al. ................ 709/225 |
| 6,054,990 A * | 4/2000 | Tran ........................... 345/348 |

* cited by examiner

METHOD AND APPARATUS FOR SENDING AND RECEIVING LIGHTWEIGHT MESSAGES

CROSS REFERENCE TO RELATED APPLICATIONS

This Application is related to and claims priority of U.S. Provisional Patent Application No. 60/062,144 filed Oct. 9, 1997, incorporated herein by reference. This Application is also related to and claims priority of U.S. Provisional Patent Application No. 60/001,875 entitled METHODS AND APPARATUS FOR REMOTE SOCIAL INTERACTIONS filed Oct. 8, 1998, incorporated herein by reference. This Application is also related to U.S. patent application Ser. Nos. (a) Ser. No. 08/610,638 now U.S. Pat. No. 5,889,843 filed Mar. 4, 1996, (b) application Ser. No. 09/169,839 entitled METHOD AND APPARATUS FOR SENDING PRESENCE MESSAGES filed Oct. 9, 1998, (c) application Ser. No. 09/169,713 entitled ELECTRONIC AUDIO CONNECTION SYSTEM AND METHODS FOR PROVIDING SAME filed Oct. 9, 1998, and (d) application Ser. No. 09/169,713 entitled VARIABLE BANDWIDTH COMMUNICATION SYSTEMS AND METHODS filed Oct. 9, 1998, all four being incorporated herein by reference.

BACKGROUND OF THE INVENTION

1. Field of the Invention

This invention relates generally to group communication systems, and more particularly to electronic group communications systems for remotely linking two or more geographically separated spaces for social interaction.

2. Description of the Related Art

Electronic communication systems technology provides an incredible number of ways for people to communicate with each other. Everyday examples of such communication systems include telephones, answering machines, and pagers. Communication systems that are adapted for the workplace include computer network file-sharing, electronic mail ("email"), fax machines, electronic whiteboards, and telephone and video conferencing. Important classes of these systems include asynchronous document-management systems and synchronous conferencing systems.

Asynchronous document-management systems enable users to exchange email and access shared databases to create, read, and revise documents. Because these systems manage documents that persist over time, users of these systems can work independently from one another; for example, one can send an email message at any time of day, without having to take into consideration the recipients' accessibility at the time of sending. Synchronous conferencing systems typically connect together sets of users at the same time in order to have a joint verbal discussion using shared audio and/or video channels. Often these systems provide a shared "whiteboard" channel as well, on which users can draw using "digital ink" and move a shared pointer to refer to portions of these drawings during the conversation.

FIG. 1 is a diagram of a conventional asynchronous document-management system 10 of the prior art. The system 10 includes a server 12 and a plurality of clients 16 coupled together by a network cable 18. The server 12 is typically a computer with substantial processing power and storage capacity. The server 12 stores and maintains a large number of documents 14 that are made available to the clients 16 over the network cable 18. Each individual client 16 is usually a terminal that can be operated by a single user such as a personal computer or a workstation.

The server 12 and the set of clients 16 are able to transfer and copy the documents 14 between them. The documents 14 may be any form of information or data such a word-processing documents, programs, and graphics. The network cable 18 is a communication line that is configured to transfer the documents 14 electronically between the server 12 and the clients 14 such as a phone line or an Ethernet cable.

The document-management system 10 has been very successful at providing a high-speed means for sharing information. In addition, software known as groupware increases flexibility of the shared information within the system 10. One of the most successful groupware applications is Lotus Notes, which allows a workgroup to share documents jointly and to add notes commenting upon these documents in a structured way. However, these systems are optimized for handling large quantities of typewritten textual information and thus can be cumbersome to maintain and use.

FIG. 2 is a diagram of a conventional synchronous conferencing system 20 of the prior art. Microsoft Net Meeting is one example of a conferencing system 20 that includes clients 22 that are connected by a network cable 24. For ease of illustration, only two clients 22a and 22b are shown, however, as is well known in the art, many more clients 22 can be connected to the cable 24 to allow more users to join the conference. Users of the conferencing system 20 are able to communicate directly with each other to view and modify a shared "whiteboard" document 26 at the same time through the clients 22.

FIG. 3 is a flow diagram of a synchronous conferencing system 30 of the prior art. The conferencing system includes a server 32 that is connected to a number of clients 34. For ease of illustration, only two clients 34a and 34b are shown, however, as is well known in the art, many more clients 34 can be connected to the server 32. The server 32 maintains an updated-shared document 36 that is available to the clients 34. When the users "hang up" and disconnect from the conference the updated-shared document 36 is not automatically saved.

While synchronous conferencing systems enable users to jointly view and modify documents at the same time many lack a quality known as persistence which is inherent in all asynchronous systems. For example, when an email message is received, the content of the communication must be persistent because it is generally not read immediately. Because the message is saved on the receiving computer the recipient can then read, print, or respond to the message at her leisure.

In contrast, because synchronous communication focuses upon real-time coordinated interaction, the content of the shared whiteboard document in most synchronous conferencing systems is ephemeral. Generally, when all of the users disconnect from a synchronous system, the content of the shared document is lost. There are electronic communication systems that allow for the preservation of the shared document, however the prior art methods for doing so are not very flexible and generally require an explicit request from the user.

In summary, prior art asynchronous document-management systems allow users at their leisure to exchange messages at their leisure and jointly add to, read, and revise a persistent shared database, but require users to follow formal and cumbersome procedures designed to enable large text-based databases. Prior art synchronous conferencing systems allow sets of users to converse in real-time and provide easy, flexible access to a shared digital-ink-based whiteboard document. However, they require the conversing users to use the system all at the same time, and are not easily configured to save the content of the shared document. In view of the foregoing, it is desirable to have a method and apparatus of social interaction that provides for an easy-to-use means of communication combining aspects of both asynchronous document-management systems and synchronous conferencing systems.

SUMMARY OF THE INVENTION

The present invention fills these needs by providing an efficient and easy to use method and apparatus of semi-synchronous communication. It should be appreciated that the present invention can be implemented in numerous ways, including as a process, an apparatus, a system, a device or a method. This method and apparatus of social interaction allows users to communicate at their leisure (asynchronously or "semi-synchronously") by providing simple, flexible access to a persistent, shared space. Several embodiments of the present invention are described below.

A first embodiment of the present invention takes the form of an electronic communication system that provides a shared persistent data space to a plurality of clients. This system comprises a server and at least two input/display units (IDUs) which clients use to access shared persistent data in the form of group boards. The group boards store discrete notes in a group database made accessible to all members of the group. The server may be centrally located separate from the IDUs or, alternatively, the server may be a virtual server distributed across the IDUs. In any event, the server maintains at least one group board database thereby creating a shared persistent space accessible by the IDUs.

In order to allow clients to select a desired group, each IDU includes an input detection space operable to receive user input indicative of a request to access a specific group. The input detection space can take on a wide variety of forms such as an array of electromechanical buttons, a touch or pressure sensitive device, a digital inking device, a token input device (tokens each have some identification in the form of circuitry or such), or a voice command device.

In order to allow clients to enter data into the board group database, each IDU includes a note data input device. Like the input detection space, a wide variety of note data input devices are contemplated. For example, a touch, stylus or pressure sensitive device would be suitable. A scanning device also works well, creating a unique persistent space wherein users can exchange discrete note messages of a variety of forms such as handwritten notes and photographs.

The present invention also teaches a variety of methods for operating the electronic communications systems described above. For example, certain methods enable multiple boards to be accessed by a single IDU. In the case of the token input detection space, the input detection space is capable of receiving and detecting multiple tokens in order to access more than one board group.

The present invention also teaches the creation and maintenance of electronic database through the use of a scanning input device. Using the scanning input device for data entry enables the database client to assemble numerous discrete notes of varying type within a single database. E. G., the notes could be scanned photographs, handwritten notes, word processor documents, etc. This enables the database client to assemble, view and manipulate data arising from a wide variety of sources.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

A method and apparatus for semi-synchronous communication within a shared persistent space is disclosed. In the following description, numerous specific details are set forth to provide a thorough understanding of the present invention. One skilled in the art will understand that the present invention may be practiced without some or all of these specific details. In other instances, well known process operations have not been described in detail in order not to unnecessarily obscure the present invention.

Figure 1:
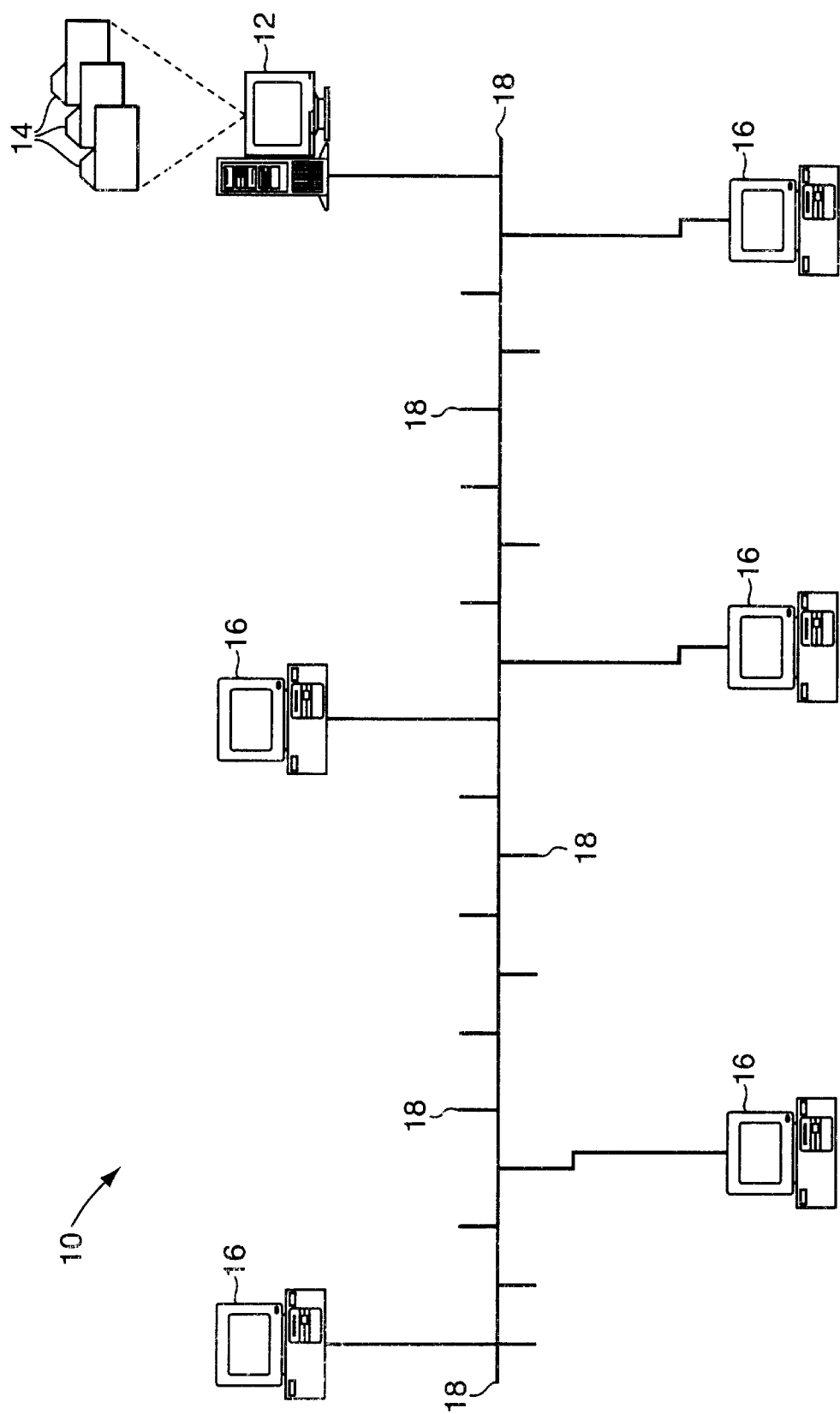
FIG. 1 is a diagram of a asynchronous document management system of the prior art.
Figure 2:
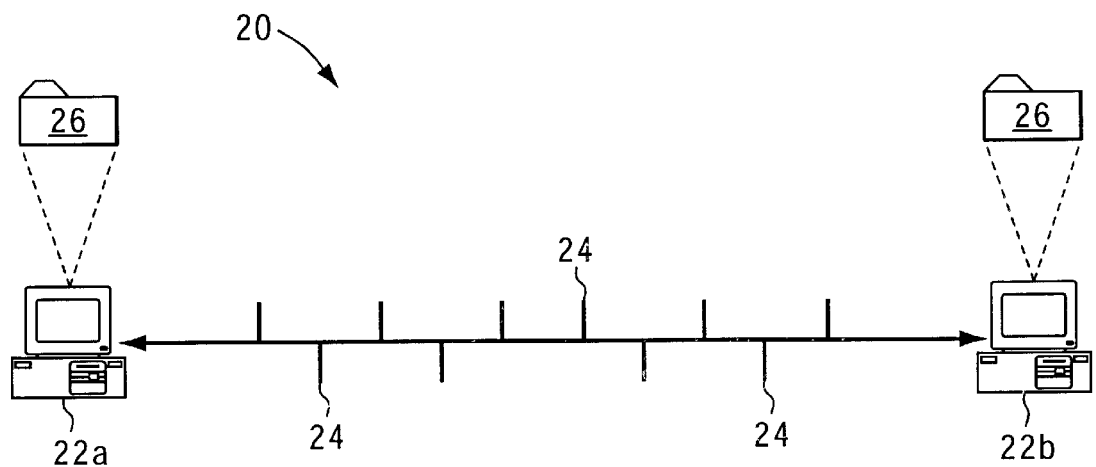
FIG. 2 is a diagram of a synchronous conferencing system of the prior art.
Figure 3:
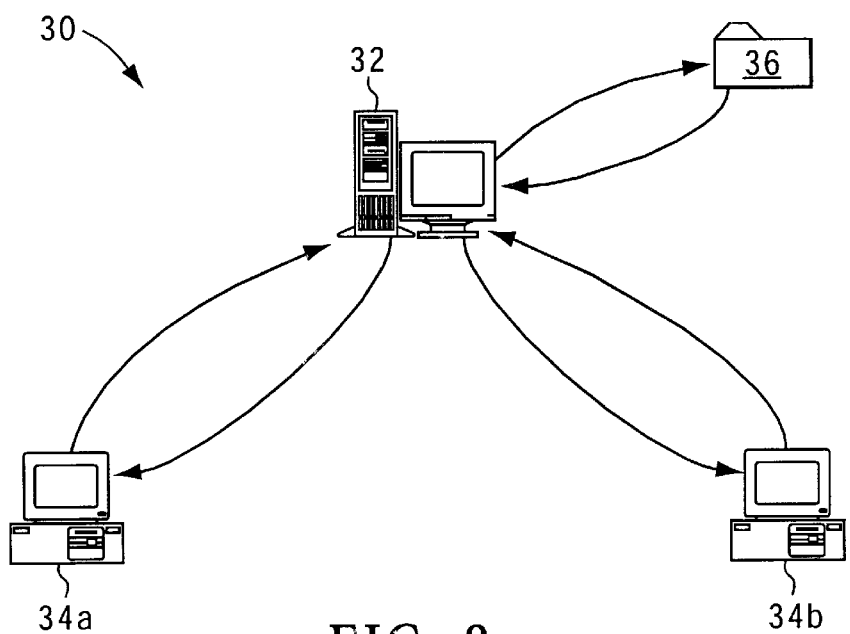
FIG. 3 is a flow diagram of a network conferencing system of the prior art.
Figure 4:
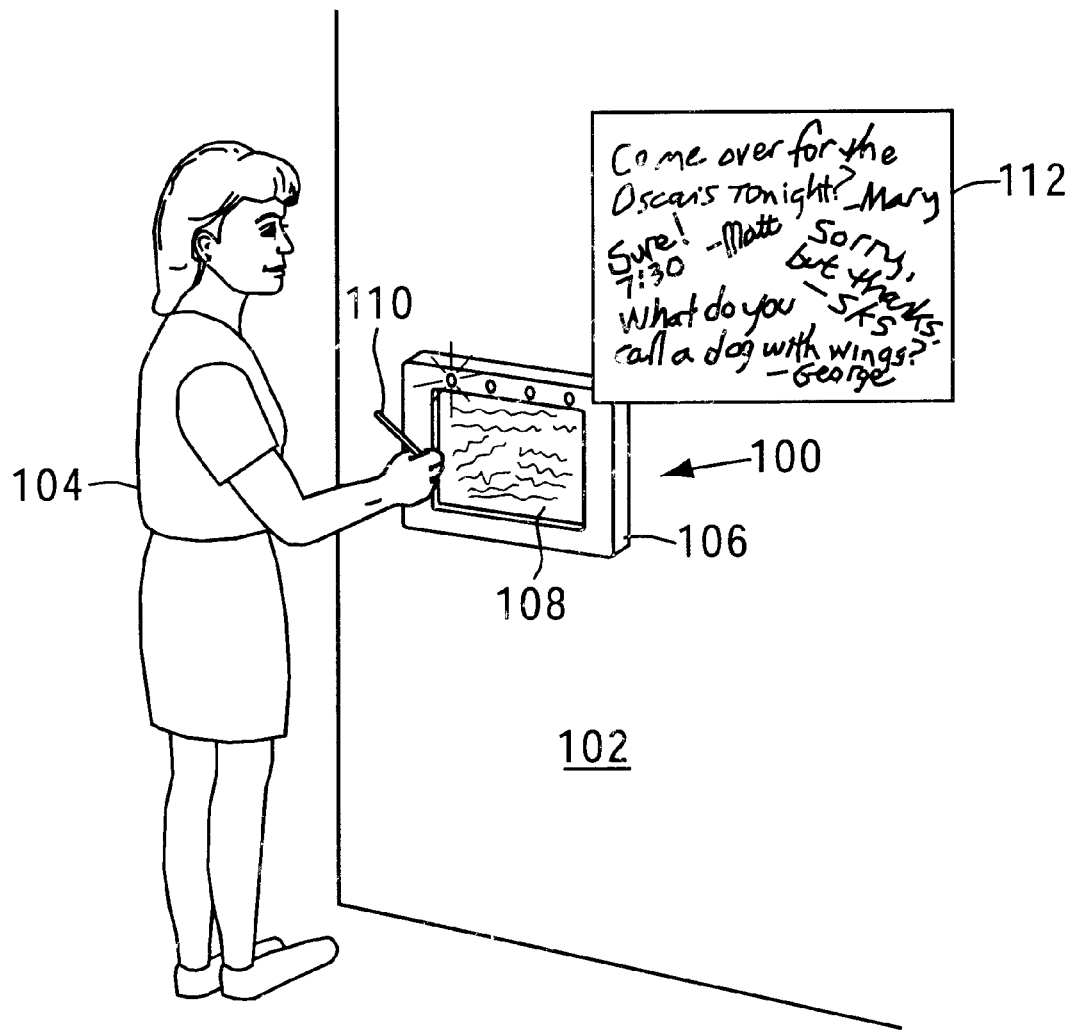
FIG. 4 illustrates one embodiment of a control unit of the present invention, which is known as PinBoard.

FIG. 4 illustrates an input/display unit 100 of one embodiment of the present invention, which is known as PinBoard. The input/display unit (IDU) 100 is generally mounted on a wall 102 or any other suitable flat surface such as a table or even a refrigerator door so that a user 104 has easy access to the IDU 100. The IDU may also be a software product for use on a desktop computer. In this example, the IDU 100 includes a frame 106 and a touch screen display 108. The user 104 is able to input data directly to the IDU 100 through the touch screen display 108. As described below with reference to FIG. 5, the IDU 100 is networked together with other IDUs 100.

By pressing a stylus 110 against the touch screen display 108, the user 104 can write a message to other users as shown on an enlarged view 112 of the touch screen display 108. The data input by the user 104 is carried to other IDUs 100 by a PinBoard network. The other users may see the message written by the user 104 after a short delay if they are viewing the touch screen display 108 of their own IDUs 100 at the time of reception, or they may see the message at some later time. It is in this manner that the present invention allows access to a shared persistent space by a number of users.

Figure 5:
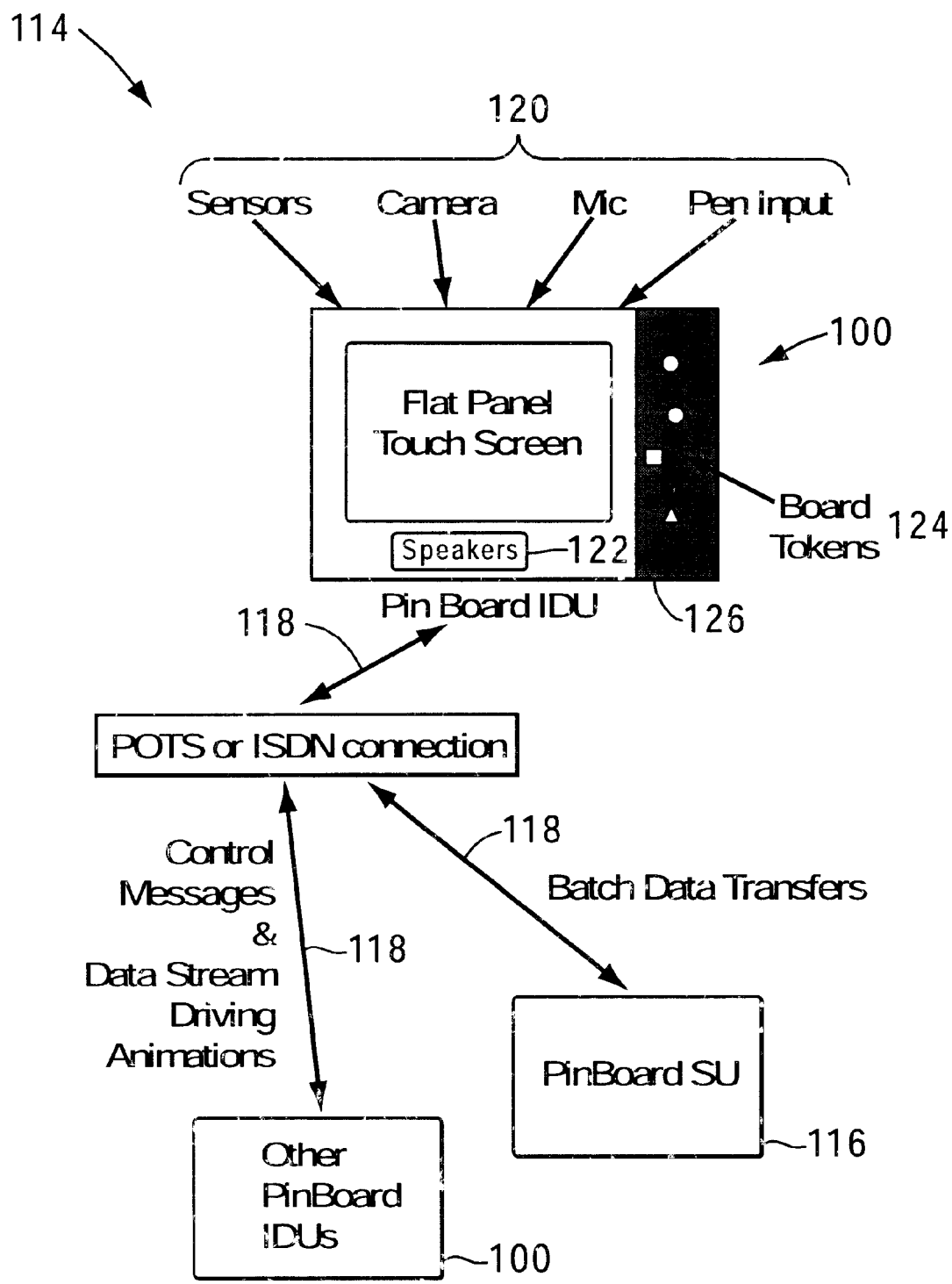
FIG. 5 is a block diagram of a pinboard electronic communications system in accordance with one embodiment of the present invention.

FIG. 5 is a system diagram of a PinBoard network 114. The PinBoard network includes multiple IDUs 100 and multiple storage units 116 connected together by one or more transmission mediums 118. Examples of transmission media 118 include wireless modems, a plain-old-telephone-service (POTS) or ISDN connection, and the Internet. The IDU 100 preferably includes input devices 120. Examples of specific input devices 120 include a microphone, a camera, a scanner, and the stylus 110. Data from the PinBoard network can be output through the touch screen display 108 and/or set of speakers 122.

The IDU 100 also includes a set of tokens 124, and a token holder 126, which in this example is a Velcro surface on which the tokens 124 are mounted. The tokens 124 are generally objects that can easily be held between a user's thumb and index finger such as a simple push button. The tokens 124 are activated when data on a storage unit 116 is modified. The tokens 124 preferably indicate their state by for example, glowing brightly when a modification has occurred. The user may then use the tokens 124 to request and display data from the storage units 116. After examining the transmitted data, the user may then make modifications using one of the input devices 120.

Figure 6:
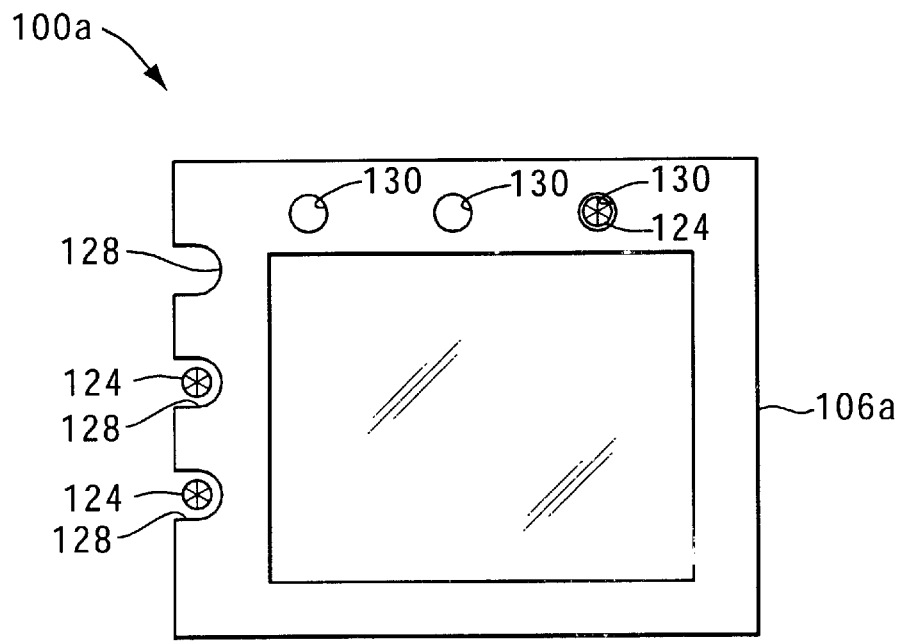
FIGS. 6–7 illustrate two particular PinBoard devices.
Figure 7:
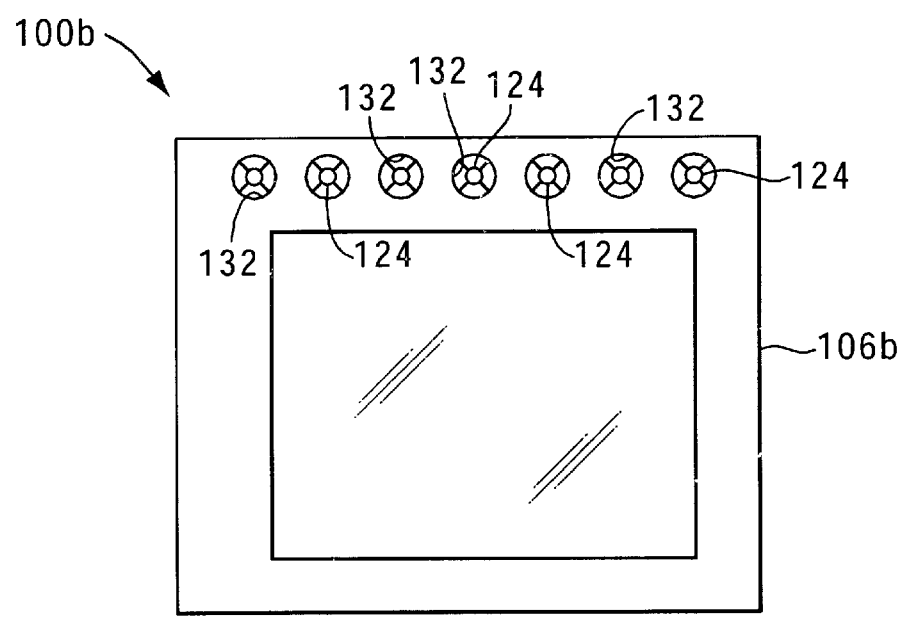

FIG. 6 illustrates one embodiment of the IDU 100a. The IDU 100a has a frame 106a that includes a number of cradles 128, which function as a place to hold and store tokens 124. The frame 106a also features a slot 130 where tokens 124 can be inserted to request and display data from a storage unit 116. FIG. 7 illustrates another embodiment of the IDU 100b. The IDU 100b has a frame 106b that includes a number of slots 132. Tokens 124 are stored in the slots 132, and can be pushed down into the slots 132 to request data from a storage unit 116. The tokens 124 may also be removed.

Figure 8:
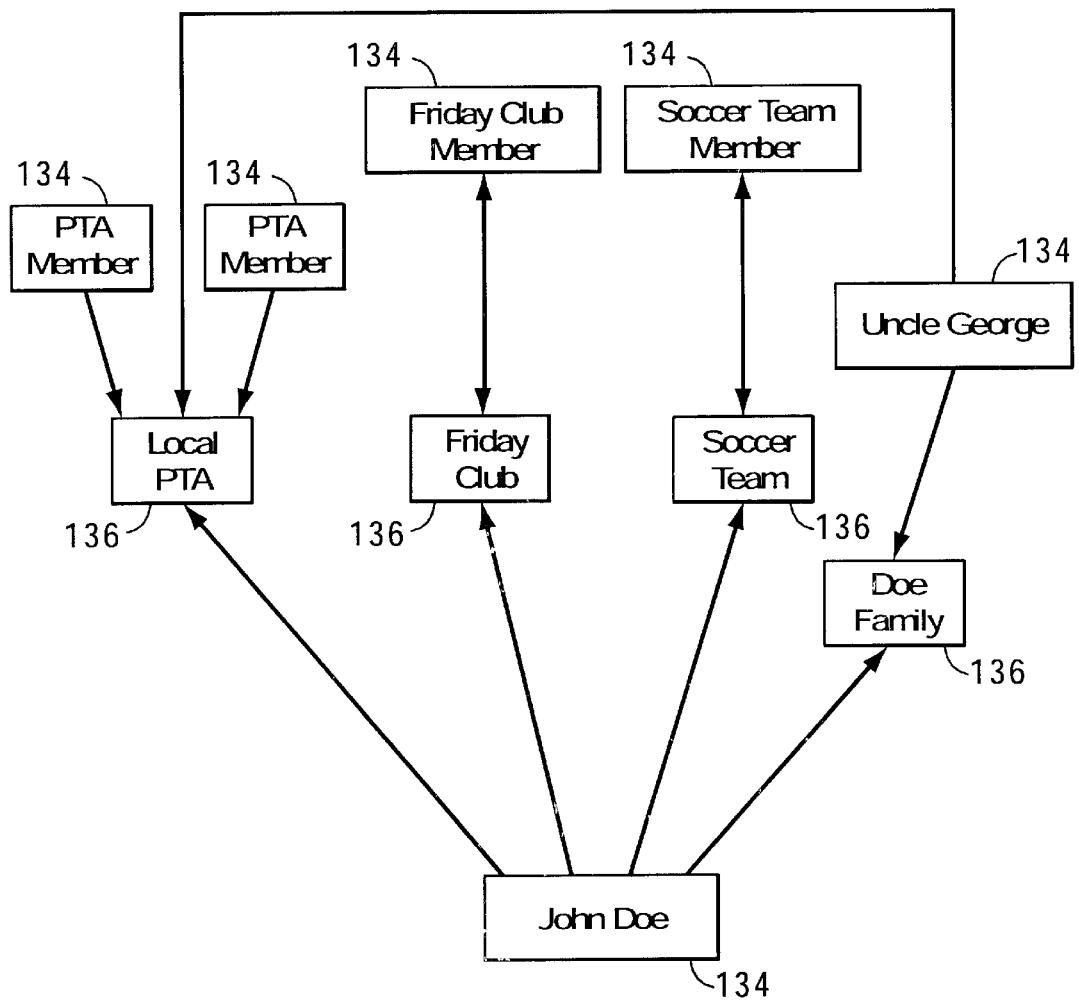
FIG. 8 is a diagram structure of several boards with multiple members, the structure in accordance with another embodiment of the present invention.

FIG. 8 is a diagram of a number of members 134 and a number of boards 136 on the PinBoard network 114. John Doe is a member 134 of all of the boards 136 including the Local PTA board 136, the Friday Club board 136, the Soccer Team board 136 and the Doe Family 136. Each board 136 has its own number of members 134 that John can communicate with by using the boards 136. For example, John can communicate with Uncle George by using the Doe Family board 136 and vice versa. Uncle George also happens to be a member of the Local PTA board 136, and John could conceivably leave a message for him there as well. However, that message would also be visible to all the members 134 of the Local PTA board 136. These transactions can occur by manipulating the tokens 124 as described below.

Figure 9:
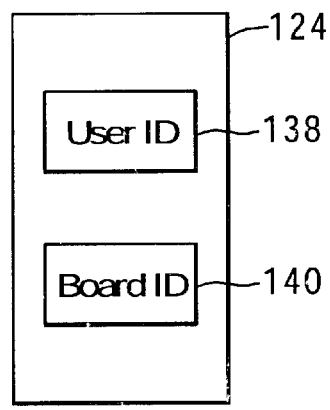
FIG. 9 is an illustration of a logical representation of a token in accordance with yet another embodiment of the present invention.

FIG. 9 is an illustration of a logical representation of a token 124. Each token 124 includes a user identification 138 and a board identification 140. Continuing from the above example, if John wants to access the Soccer Team board 136, he would use the token 124 that contains the board identification 140 for the Soccer Team board 136 to command the IDU 100 to access the correct storage unit 116 and the correct board 136. The token 124 allows John to request data from and to the Soccer Team board 136.

John's user identification 138 would be input so that he could be identified to other members 134 of the Soccer Team board 136 as the member 134 making modifications.

In addition to its functionality, tokens may also be shaped to represent each board 136. For example, the Soccer Team board 136 could be represented by a token 124 that is shaped like a soccer ball. Tokens 124 provide a way for members 134 to express themselves and the social relationships they have. For example, high school sweethearts could share a board 136 between themselves and access the board 136 with heart shaped tokens 124. The Local PTA board 136 could be accessed with tokens 124 that are shaped like a school house or a book and so forth.

Figure 10:
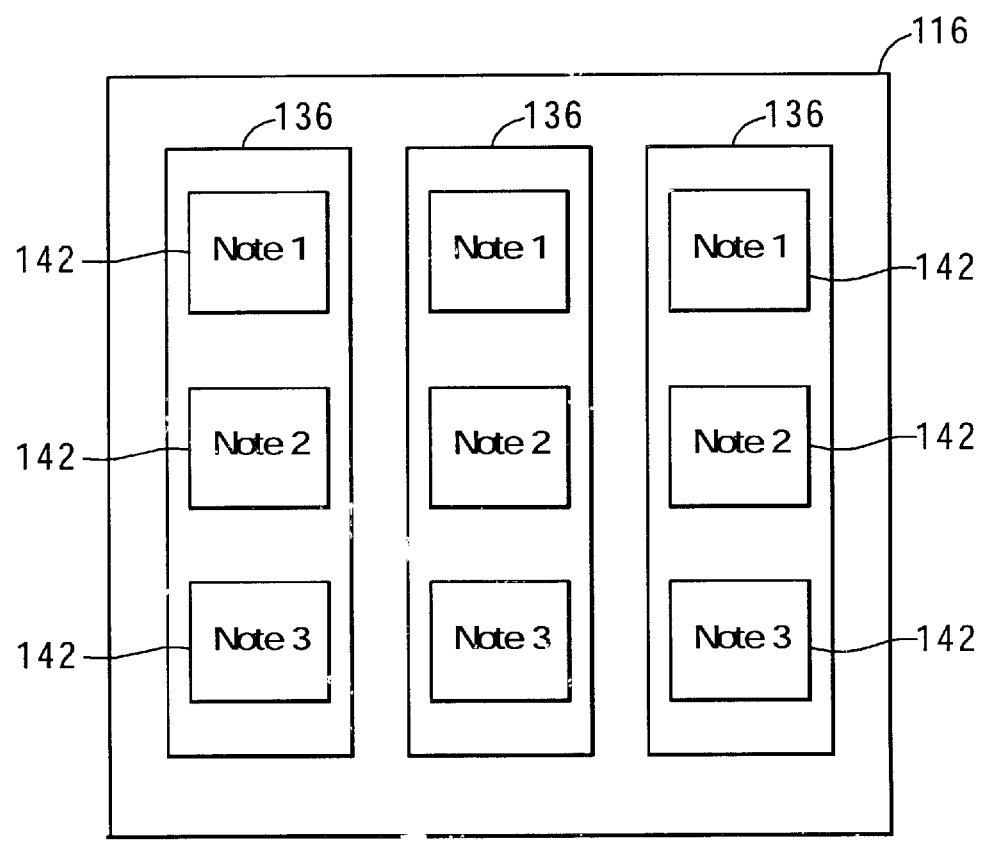
FIG. 10 is a diagram of a logical representation of a board database within a storage unit in accordance with still another embodiment of the present invention.

FIG. 10 is a diagram of a logical representation of a board 136 within a storage unit 116. Boards 136 are stored and maintained by storage units 116 which transfer data to IDUs 100 as described above. Each storage unit 116 may include a number of boards 136. Each board 136 then further includes a number of notes 142. Each note 142 is a contribution to the board 136 from an individual member 134. All the members 134 with the correct board identification 140 in their token 124 may view the board 136 and all the notes 142 that are on it at the given time.

Referring back to FIG. 5, an IDU 100 preferably implements the following functions: request (and display) contents of boards 136 from a storage unit 116 when its token 124 is pushed; activate attached token 124 when notified that corresponding board 136 has been modified; record, play, and edit notes 142 on currently displayed board 136; send new or modified notes 142 to the storage unit 116 for storage and propagation to other IDUs; and request the storage unit 116 to create or delete a board 136.

A storage unit preferably includes a storage medium (e.g., disk), a modem or other communication device for connecting to IDUs, and a processor that runs the control software. A storage unit acts as a file server, implementing the following functions for each board it serves: send board contents to the IDU; receive board contents from the IDU; add the IDU to or delete the IDU from owner list of the board; send notification that the board has been modified to the IDUs on its owner list; and create or delete the board. The IDU and the storage unit may be packaged together as a single appliance, or the storage unit may be provided by a centralized service that IDUs call into.

There are various kinds of notes, including ink notes produced by freehand drawing on an input surface, typically contain handwriting and drawings; text notes produced by typing on a keyboard, or by applying optical character or handwriting recognition to an ink note or scanned document; and audio notes produced by recording into a microphone. Other types of notes include image notes which produced by electronic cameras or scanning, such as comic strips; video notes which are produced by recording into a microphone and video camera. Background notes are a special kind of ink notes, which serves as the background for a board.

The following actions can be performed on notes: (1) record/create; (2) attach to existing note (e.g., as a reply); (3) play/enlarge; (4) pin to board (add to the storage unit from local copy on the IDU); (5) unpin from board (remove from the storage unit, and maintain only as a local copy on the IDU); (6) move to new position on board; (7) delete; (8) export into token; and (9) import from token.

In one preferred embodiment, notes are attached to a board. The board is a shared virtual surface on which notes can be pinned. Associated with it is a list of IDUs who own it. When the list changes, the IDUs for all owners are notified. Boards have distinctive, patterned backgrounds that can be written on. The "pins" are small graphical icons that appear on a note that can specify which user produced it. The border of a note is black when first pinned, and gradually fades as time elapses. Thus, a quick glance at a note can furnish information about who posted it and when.

Alternate embodiments of the PinBoard include: multiple boards; more than two households connected; more than one IDU per household; disk storage of messages; active objects or tokens; and the visual "aging" of messages. One close variant includes a single shared surface for all members of an interconnected group. This has an advantage of simplicity, as multiple boards need not be managed. However, this embodiment constrains all members of an interconnected group to be completely interconnected, which sometimes is not desirable. Consider households A and B, both of which want to communicate with household C, but which themselves have no desire to communicate. A single-board system would force A and B to be connected to each other to the same degree they are connected to C.

Figure 11A:
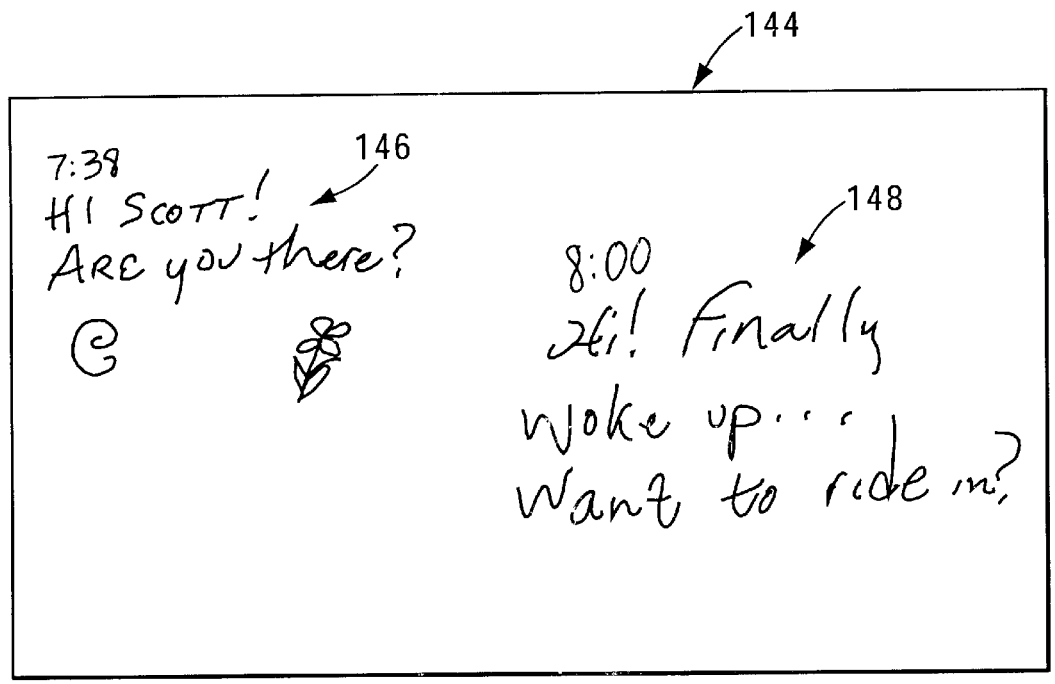
FIGS. 11A–11C illustrate three screen shots of a PinBoard display.

FIG. 11A is a screen shot of a PinBoard display 144. The PinBoard display 144 includes two messages from a remote IDU are displayed on a local IDU, namely a note 146 time-stamped 7:38 inquiring if Scott was there, and another note 148 time-stamped at 8:00 relaying that Scott has "finally woke up." When note 148 is posted, it preferably appears in the area of the PinBoard display 144 where created by the user.

Figure 11B:
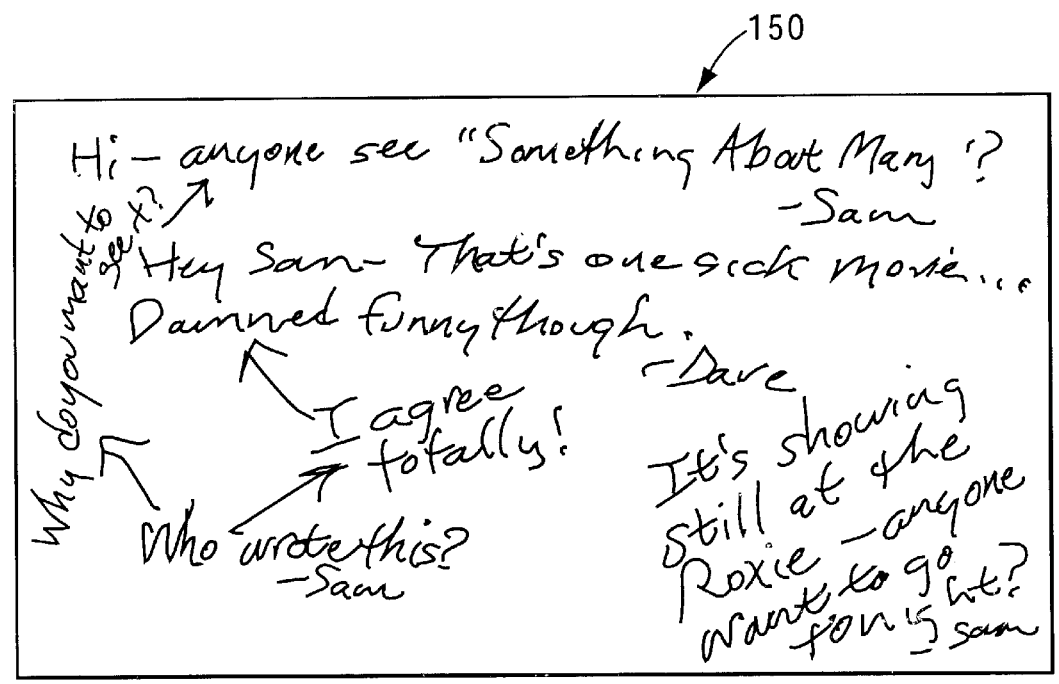

FIG. 11B is a screen shot of a PinBoard display 150 showing restricted screen availability. In this embodiment, users cannot over-write each other's postings and, since the screen is full, something must be "erased" or a new screen must be brought up in order to create new postings. In other embodiments, over-writing or layering is allowed. In a preferred embodiment, each note can have a rectangular border, and lay over the top of older notes. The users have control how the notes are displayed and are able to move each note by clicking and dragging it with a finger on the touch screen display.

Figure 11C:
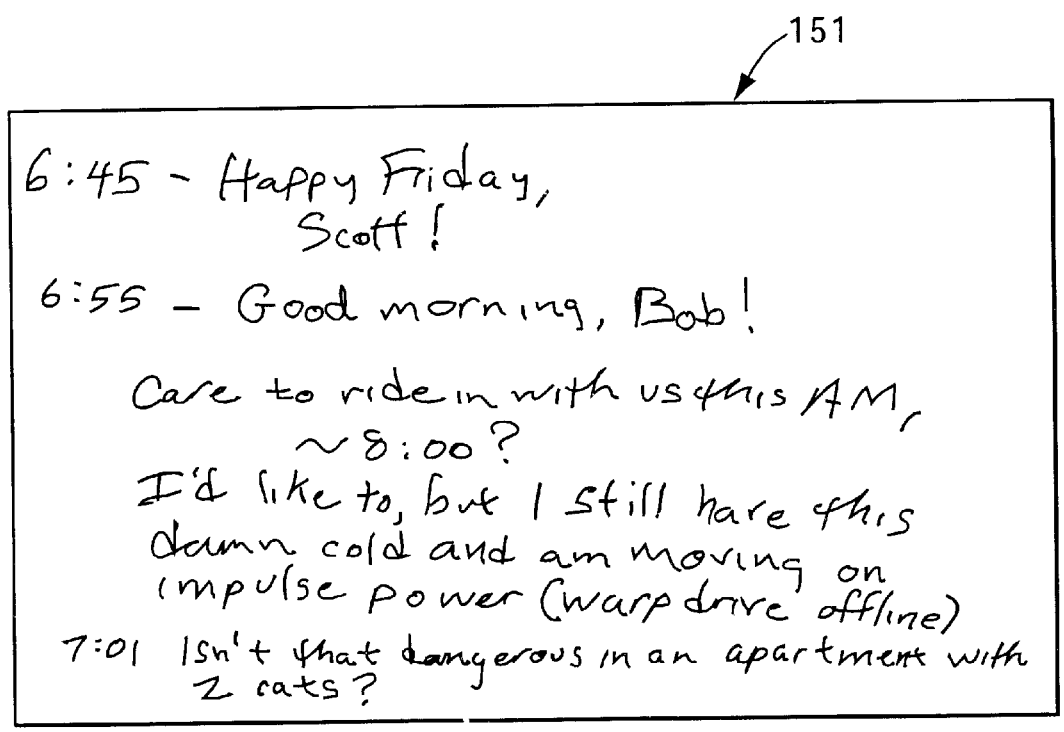

FIG. 11C is a screen shot of a PinBoard display 151 showing structured sequencing. A problem in determining the chronological order of messages can occur if messages are randomly written to the screen. With this structured sequencing embodiment, the messages are time-stamped and provided in chronological order so that the sequence of messages is apparent. It is preferred that the time stamping is an automatic function of the system, but the time stamping can also be entered manually by the users as an informal custom.

Figure 12:
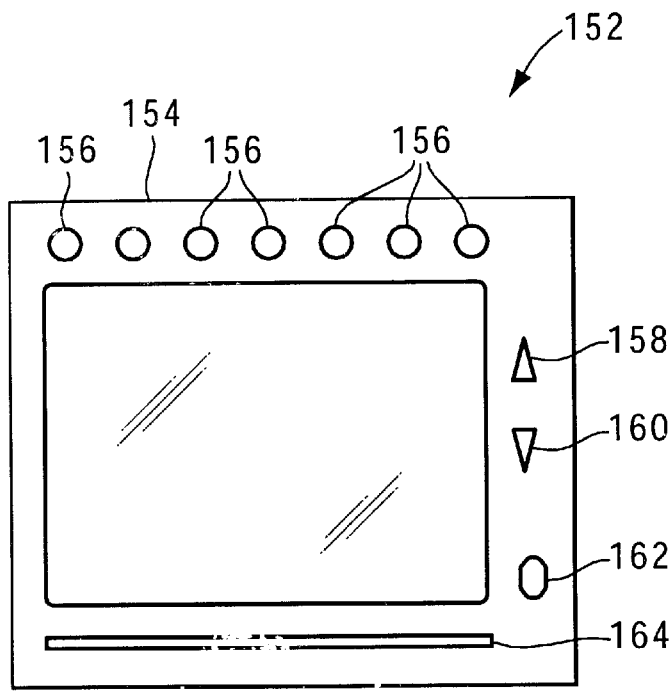
FIG. 12 illustrates an input/display unit (IDU) in accordance with another embodiment of the present invention, known as ScanBoard.

FIG. 12 illustrates an IDU 152 in accordance with another embodiment of the present invention, known as ScanBoard. The IDU 152 includes a frame 154 and a touch screen display 156. A set of control buttons are mounted on the frame 154 including a series of group area buttons 156, a forward button 158, a backward button 160 and a system button 162. The group area buttons 156 function in the same manner as tokens 124 in the PinBoard network 114 of FIG. 5. The frame 154 also includes a scanner slot 164 that allows access to a scanner that is configured to fit inside the IDU 152.

A ScanBoard network of the present invention includes of any number of clients running on custom scanner/display appliances and servers running on standard computer hardware, connected together by some transmission medium such as telephone lines, wireless modems or the Internet. Thus, the system may be configured in a similar fashion as the PinBoard network 114. Message items are accumulated and accessed according to "group areas" which are similar to boards in function. A group area is a layered heap of thumbnail images of scanned items, together with a list of group members who may access the area.

The IDU 152 implements the following functions: request (and display) the current contents of a group area from a server; turn on a "message waiting light" when notified by a storage unit server that the group area has changed; scan an item, manipulate scanned item, and display locally; send scanned item to server for "publication" to other IDUs in the group area; move the location of items within and across group areas, and notify the storage unit server of changes; and create, remove, or modify the group area or list of users who may access it.

Figure 13:
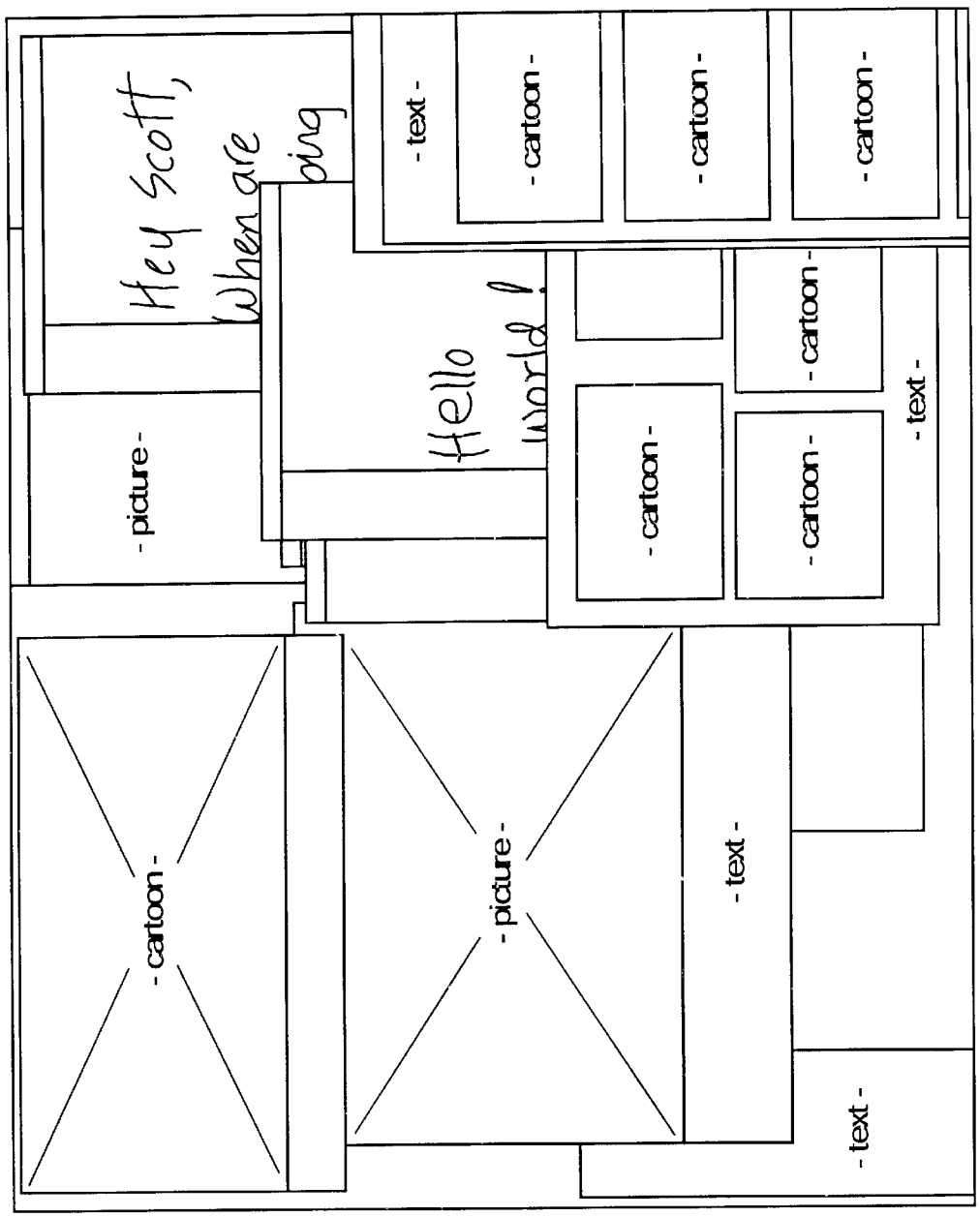
FIG. 13 is a screen shot of the touch screen display of the ScanBoard IDU of FIG. 12.

FIG. 13 is a screen shot of the touch screen display 156 of a ScanBoard IDU 152. The user interface resembles a bulletin board comprising images that have been scanned into the system. The appliance's display can be in one of two states: a shared view of a group area or a local view of a single item. The shared view consists of a "pile" of potentially overlapping items, displayed in a photo-reduced, "thumbnail" form. If two items overlap, the one at the higher level occludes the one at the lower level. All users in a group area share the same shared view. When an item is displayed with a local view, the screen shows only that item, in photo-magnified form.

When a user scans in an item, a thumbnail version of it is placed at a random position at the top of the shared pile currently displayed on the user's screen. The new item occludes all of the items beneath it. The user's own display updates immediately to show the new item. The server is notified about the new item and proceeds to update the displays of the other members of the group area.

When a new item appears in a group area to which the user has assigned one of their IDU's 152 group area buttons 156, that button lights up. To switch their IDU 152 to access a group area, the user presses the associated button. To assign a group area to a button, the user navigates to the group area by using on-screen controls and then holds down the group area button to be assigned to it until they hear a beep.

To get a local, magnified view of an item, the user taps their finger on the item through the touch screen display 156. While in local view mode, the item may be moved around the screen by "dragging" it with one's finger (or stylus) on the touch screen display 156; this allows all portions of the item to be seen, even if it is too large to fit on the screen. There are multiple ways to exit the local view and return to a global view including: tapping the screen; waiting for the display to return to a global view after a timeout period; and pushing a group area button.

When the appliance is displaying an item in a local/magnified view, the user can change the item being displayed by pressing the forward or backward buttons 158 and 160. Pressing the forward button 158 switches the IDU 152 to displaying the item in the layer immediately above the current item; pressing backward button 160 switches the IDU 152 to displaying the item in the layer immediately below.

When the appliance is displaying a group area, upper layers may be removed to reveal what is (potentially) being occluded below them by pressing the backward button 160. Each press removes the currently displayed top-most layer. Similarly, the forward button 158 causes the layer above the currently displayed top layer to be displayed, reversing the effect of the backward button 160. If the backward button 160 is pressed with no layers currently displayed, or if the forward button 158 is pressed if no layer exists above the currently displayed top level, nothing happens except for a clicking sound. Holding the backward or forward buttons 158 and 160 down for a second or so causes an "auto-repeat" mode, so layers are quickly, successively removed or restored. The display will revert to showing all layers if no activity occurs for about 30 seconds.

Instead of tapping on a thumbnail in the global view to display it, the user can select it by pressing their finger on it for a short period (about 1 second). The selected item is marked with an icon that appears to float (at the highest level in the heap) above the item's upper left corner. Clicking on this icon will de-select the item. (The item will automatically be de-selected after some period of inactivity has passed.) Only one item can be selected at a time. When a user scans in a new item, it is initially selected automatically.

A number of global operations can be performed on a selected item. To move the selected item in the x-y plane, the user "drags" it with their finger or stylus. To increase or decrease the selected item's level in the "pile", the user presses the forward button 158 or the backward button 160. To move the selected item to a new group area, the user presses the button for that group area. The item is then deleted from the original group area, and added as the top level of the new group area. (If the user changes their mind and wants to return the item to its original group area, and the item has not become de-selected, they can accomplish this by pressing the button for the original group area. Then the item will be returned there at its original level.) To delete the item, the user presses the system button 162. a pop-up window appears with on-screen buttons to perform various infrequent tasks, one of which is "Delete Selected Item". Unless an item is locked, it can be deleted by any user with access to the group area it appears in. To lock the item, the user presses the system button 162 and then further presses an onscreen button that appears in the pop-up window.

When an item becomes de-selected, the appliance checks if its location (group area, level within group area, and (x, y) position) has changed. If so, it contacts the server to update the information there. The server in turn notifies all of the appliances connected to that group area that the group area has changed. When notified of a change, the appliance downloads the updated information and updates its own cache accordingly.

A number of days after an item was last created (or de-selected), the server marks it for archiving. Items marked for archiving are displayed as translucent, and they become more and more transparent until they actually become archived, at which point they disappear from the group area entirely. (From the controls on the pop-up window that appears when the user presses the system button 162, the user can retrieve items from the archive.) As described, the interface provides a set of local and global functions. Local functions affect only the individual user's display; global functions affect all the users of a group area.

Local functions include: switching between "display single item," "select single item," and "shared view" modes; uncovering/recovering layers in "shared view" mode; change layer being displayed in "display single item" mode; move item being displayed in "display single item" mode; change group areas being displayed in "shared view" mode; assigning or reassigning group area to group area button. Global functions include: scanning item into group area; moving item within group area; moving item between group areas; deleting item from group area; restoring item from archives to group area; and locking item in group area.

An alternative embodiment of the ScanBoard is a handwriting-only system, based on a shared whiteboard on which users directly "write" using a stylus that creates "digital ink." (See for example, the PinBoard description, above.) ScanBoard is superior in that richer media types (e.g., snapshots and newspaper clippings) can be exchanged between users, making for a richer user experience. Because ScanBoard requires only simple touch interactions, and not high-sample-rate pen input, its digitizer/display is somewhat less expensive. Directly writing on the screen, to add content to new blank items or to previously scanned items, may be a desirable feature to add to ScanBoard, to get the best of both interface paradigms.

Another alternative embodiment replaces the touch screen with an ordinary, output-only display. Items are displayed, selected, and otherwise manipulated by means of buttons, a mouse or mouse-equivalent, or both. (One possibility would be to permit display, selection, movement, etc., of only the top level item; the user would use the forward or backward buttons 158 or 160 to place the item of interest at the top level, and then additional buttons (Display, Move, Delete, etc.) to operate on this item.) However, using a touch screen is believed to create a more immediate and satisfying user experience.

Yet another alternative is to use a conventional tube display, rather than a flat-panel touch screen. For example, the appliance can look (and function) as an ordinary television. Compared to this, the flat panel solution has advantages in weight and ease of mounting on a wall, though it would be more expensive. Ordinary TV displays would also suffer problems in resolution.

Instead of a scanner, the user can use some other device for entering images into the system, such as a digital camera or graphics file email attachment. Digital cameras have some advantages to scanners, and a plug for digital camera input is considered to be a valuable extension to ScanBoard. However, digital cameras are not well suited for capturing printed documents. Email attachments or other mechanisms for remotely sending images to a ScanBoard also have their place, but lack the immediate gratification of seeing printed/handwritten material immediately transformed into digital form on the ScanBoard screen.

Yet another alternative embodiment provides a software-only system, the users having to provide their own hardware (display, scanner, other is input devices). However, existing hardware is not adapted for the kind of image sharing/messaging interactions that the ScanBoard software provides. For example, conventional PCs are usually located in parts of the house that are inconvenient for checking and leaving messages, and are not left on continuously.

In solving a communication problem, ScanBoard solves a database access problem: how to provide a simple mechanism for displaying to a group of authorized users a large number of discrete items, allowing those users to act upon them. This kind of database access problem arises in many situations such as in presenting email messages, or the results of a database query, or the options for viewing one of many television channels, or the contents of a file system.

By modifying the kinds of data that are entered into the system and the mechanisms for display and manipulation of data items, ScanBoard-like interfaces could be used in a wide range of applications, such as shells for operating systems. The ScanBoard has a number of valuable uses. For example, ScanBoard's functionality is a valuable addition to PCs (or other in-home "information appliances"). A stand-alone ScanBoard device is an attractive way to digitize, organize, and display photos.

Figure 14:
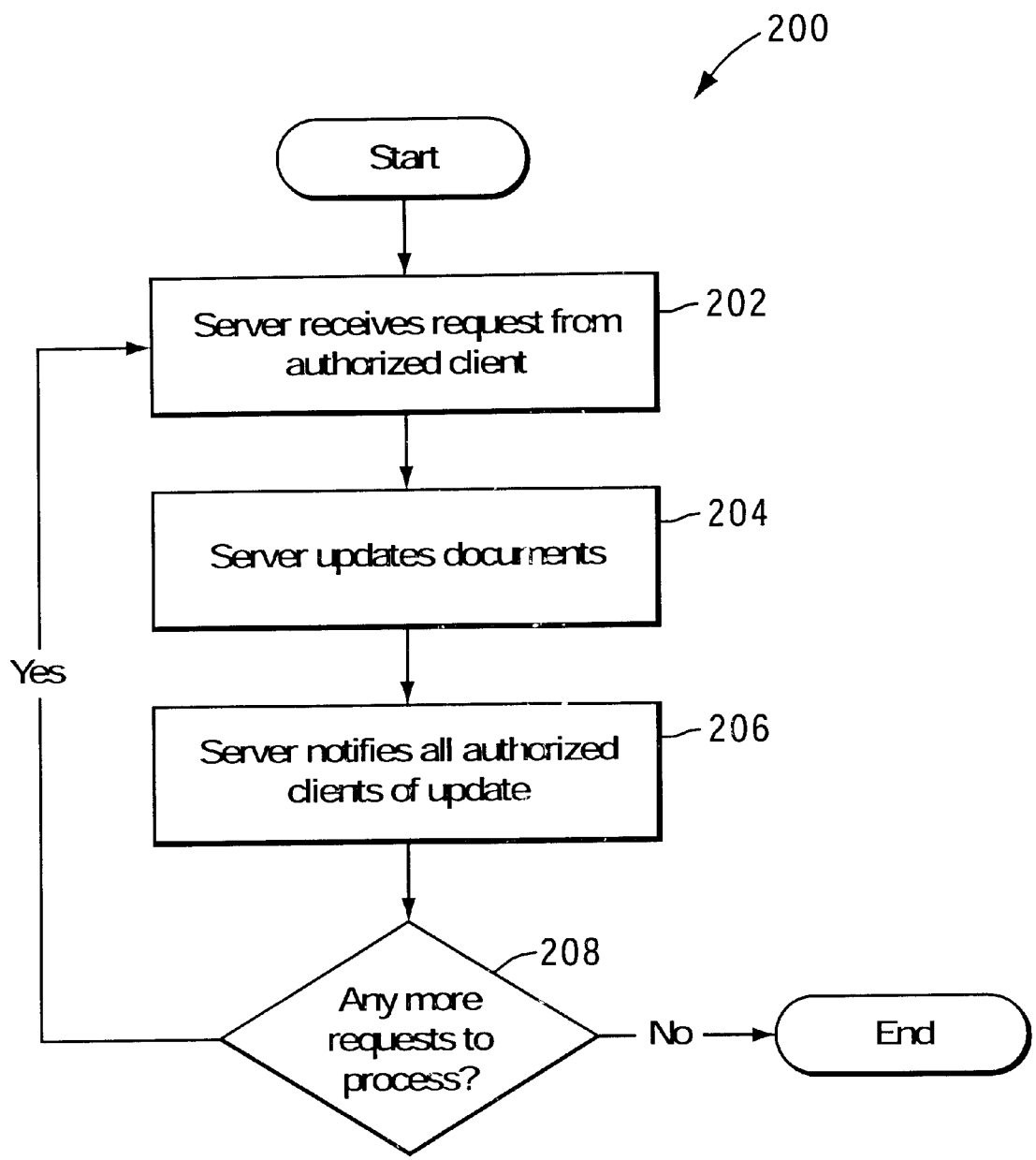
FIG. 14 is a flow chart illustrating a client server communication protocol in accordance with one aspect of the present invention.

FIG. 14 is a flow chart of a method 200 of the present invention. The method 200 starts at an operation 202 when the server receives a request from an authorized client to modify a shared document. The server then carries out the request by modifying the shared document in an operation 204. After the server modifies the shared document, it is updated, and the server notifies all authorized clients of the change in an operation 206. The method 200 repeats itself until it is determined in an operation 208 that there are no more requests to process and the method 200 ends.

While this invention has been described in terms of several preferred embodiments, it will be appreciated that those skilled in the art upon reading the preceding specifications and studying the drawings will realize various alterations, additions, permutations and equivalents thereof.

The above discussion focused on the use of tokens and token detection spaces for initiating access to the group boards. However, a variety of input detection spaces useful for accessing boards are contemplated. For example, an IDU could be equipped with an array of electromechanical buttons each associated with a particular group. These buttons would preferably have a decal or some other visual indication of the nature of the associated group. Additionally, a feedback mechanism like an LED or such could indicate whether the associated group had been modified since it was last displayed on the IDU.

Another suitable input detection space could be formed from a pressure, touch, or stylus sensitive input device. Such a device could implement button-like operation or even digital inking. In the case of digital inking, the user could write in the desired board group and a handwriting recognition engine could determine the identity of the requested board group. Additional input detection spaces can be formed using voice recognition technology for entering group identifiers vocally. Of course, standard data entry technology such as keyboard and keypads would be suitable for manually entering group identifiers.

Those skilled in the art will appreciate that the client-server communications protocol adhered to could be selected from a variety available depending upon the desired system behavior. In one model, for example, the server could contact and update every client IDUs each time a change is made to the shared persistent space. In another model, each client IDU calls in with changes and is simultaneously updated by the server if necessary. Yet another model imposes periodic polling by the server (or client) which would result in content on both the polled client and the server being made consistent.

It is therefore intended that the present invention includes all such alterations, additions, permutations, and equivalents as fall within the true spirit and scope of the invention.

We claim:

1. An electronic communication system capable of providing a shared persistent data space to a plurality of clients of the electronic communication system, the electronic communication system comprising:

a server including a persistent storage mechanism storing a first group board database;

a first input/display unit (IDU) bi-directionally coupled with the server, the first IDU including:

a first display screen;

a first input detection space operable to receive user input indicative of a request to access a specific group;

a first note data input device operable to receive input data generated by a user of the first IDU; and a first data processing device operable to process received input data and transmit the received input data to the server, the first data processing device further operable to control the first display screen and the first input detection space, wherein when a user indicates through the first input detection device a desire to access the first group, the first IDU establishes a communication link with the server and requests access to the first group, in response the server downloads content as needed from the first group database to the first IDU and the first IDU represents the content from the first group database upon the display screen, data later input into the first IDU is transmitted to the server and the server updates the first group database to reflect data input at the first IDU; and a second input/display unit (IDU) bi-directionally coupled with the server, the second IDU including:

a second display screen;

a second input detection space operable to receive user input indicative of a request to access a specific group;

a second data input device operable to receive input data generated by a user of the second IDU; and a second data processing device operable to process received input data and transmit the received input data to the server, the second data processing device further operable to control the second display screen and the second input detection space, wherein when a user indicates through the second input detection device a desire to access the second group, the second IDU establishes a communication link with the server and requests access to the second group, in response the server downloads content as needed from the second group database to the second IDU and the second IDU represents the content from the second group database upon the display screen, data later input into the second IDU is transmitted to the server and the server updates the second group database to reflect data input at the second IDU.

2. An electronic communication system as recited in claim 1 wherein the server is a virtual server having its processing functions distributed across the first and second IDUs.

3. An electronic communication system as recited in claim 1 further including a bi-directional data communications medium, wherein the server is a remote central server coupled with the first and second IDUs via the bi-directional data communications medium.

4. An electronic communication system as recited in claim 1 wherein the first input detection space includes an electromechanical button operable to request access to the first group.

5. An electronic communication system as recited in claim 4 wherein the electromechanical button provides a visual indication of the nature of the first group.

6. An electronic communication system as recited in claim 4 wherein the electromechanical button has a feedback mechanism operable to indicate whether the group content has changed since the group was last displayed on the IDU.

7. An electronic communication system as recited in claim 1 wherein the first input detection space includes an array of electromechanical buttons each corresponding to a certain group, each electromechanical button providing a visual indication of the nature of its certain group, each electromechanical button having a feedback mechanism operable to indicate whether the associated group had been modified since it was last displayed on the IDU.

8. An electronic communication system as recited in claim 1 wherein the first input detection space includes a touch screen overlay.

9. An electronic communication system as recited in claim 1 wherein the first input detection space includes a digital inking device.

10. An electronic communication system as recited in claim 9 wherein the first input detection space further includes a handwriting recognition engine operable to interpret text data entered through the digital inking device to determine whether a group identifier has been entered therein.

11. An electronic communication system as recited in claim 1 wherein the first input detection space includes a voice controlled mechanism for recognizing vocalized requests for group access.

12. An electronic communication system as recited in claim 1 wherein the first input detection space includes a keypad for manual entry of group identifiers.

13. An electronic communication system as recited in claim 1 wherein the first note data input device includes a touch sensitive input device.

14. An electronic communication system as recited in claim 13 wherein the touch sensitive input device is a pressure sensitive input device.

15. An electronic communication system as recited in claim 1 wherein the first note data input device includes a stylus sensitive input device.

16. An electronic communication system as recited in claim 1 wherein the first note data input device includes a keyboard-input device.

17. An electronic communication system as recited in claim 1 wherein the first note data input device includes a digital inking device.

18. An electronic communication system as recited in claim 1 wherein the first note data input device includes a scanning device.

19. An electronic communication system as recited in claim 1 wherein the first note data input device includes a video camera.

20. An electronic communication system as recited in claim 1 wherein the first group database includes a plurality of notes, each note being a data input contribution made by a user of an IDU intended for the first group database.

21. An electronic communication system as recited in claim 20 wherein a one of the plurality of notes is a text note.

22. An electronic communication system as recited in claim 20 wherein a one of the plurality of notes is a digital ink note.

23. An electronic communication system as recited in claim 20 wherein a one of the plurality of notes includes a recording.

24. An electronic communication system as recited in claim 23 wherein the recording is a video recording.

25. An electronic communication system as recited in claim 23 wherein the recording is an audio recording.

26. An electronic communication system as recited in claim 20 wherein a one of the plurality of notes is a scanned image.

27. An electronic communication system as recited in claim 1 wherein the first note data input device is a scanning input device.

28. An electronic communication system capable of providing a shared persistent data space to a plurality of clients of the electronic communication system, the electronic communication system comprising:
 a server computer system including a persistent storage mechanism storing a first group board database;
 a transmission medium;
 first and second tokens each having a first group identifier indicating an association with the first group database stored on the persistent storage mechanism;
 a first input/display unit (IDU) bi-directionally coupled with the server computer system via the transmission medium, the first IDU including:
  a first display screen;
  a first input detection space arranged to receive at least one token, the first input detection space operable to determine a specific group associated with a specific token disposed within the first input detection space;
  a first note data input device operable to receive input data generated by a user of the first IDU; and
  a first data processing device operable to process received input data and transmit the received input data to the server computer system via the transmission medium, the first data processing device further operable to control the first display screen and the first input detection space,
  wherein when either the first or second token is disposed within the first input detection space, the first IDU establishes a communication link with the server computer system and requests access to the first group, in response the server computer system downloads content as needed from the first group database to the first IDU and the first IDU represents the content from the first group database upon the display screen, data later input into the first IDU is transmitted to the server computer system and the server computer system updates the first group database to reflect data input at the first IDU; and
 a second IDU bi-directionally coupled with the server computer system via the transmission medium, the second IDU including:
  a second display screen;
  a second input detection space arranged to receive at least one token, the second input detection space operable to determine a specific group associated with a specific token disposed within the second input detection space;
  a second data input device operable to receive input data generated by a user of the second IDU; and
  a second data processing device operable to process received input data and transmit the received input data to the server computer system via the transmission medium, the second data processing device further operable to control the second display screen and the second input detection space,
  wherein when either the first or second token is disposed within the second input detection space, the second IDU establishes a communication link with the server computer system and requests access to the first group, in response the server computer system downloads content as needed from the first group database to the second IDU and the second IDU represents the content from the first group database upon the second display screen, data later input into the second IDU is transmitted to the server computer system and the server computer system updates the first group database to reflect data input at the second IDU.

29. An electronic communication system as recited in claim 28, the first group database being one of a plurality of group databases stored on the persistent storage mechanism of the server computer system.

30. An electronic communication system as recited in claim 29 further comprising a plurality of tokens each having a group identifier indicating an association with a one of the plurality of group databases stored on the persistent storage mechanism.

31. An electronic communication system as recited in claim 30 wherein the placement of a one of the plurality of tokens within the first input detection space results in the first IDU representing content from the group database associated with the one of the plurality of tokens upon the first display screen.

32. An electronic communication system as recited in claim 27 wherein the first group database includes a plurality of notes, each note being a data input contribution made by a user of an IDU intended for the first group database.

33. An electronic communication system as recited in claim 32 wherein a one of the plurality of notes is a text note.

34. An electronic communication system as recited in claim 32 wherein a one of the plurality of notes is an ink note.

35. An electronic communication system as recited in claim 32 wherein a one of the plurality of notes is an audio note.

36. An electronic communication system as recited in claim 32 wherein a one of the plurality of notes is a scanned image.

37. An electronic communication system as recited in claim 32 wherein the first token further includes a user identifier indicating the owner of the first token.

38. An electronic communication system as recited in claim 37 wherein the first input detection space is further operable to determine the user identifier of the first token when disposed within the first input detection space.

39. An electronic communication system as recited in claim 38 wherein the first group database includes a list of member users.

40. An electronic communication system as recited in claim 39 wherein the first IDU is only provided content from the first group database when the user identifier of the token placed within the first input detection space identifies a user present on the list of member users.

41. An electronic communication system as recited in claim 38 wherein the first token provides an indication of a nature of the first group database associated with the first token.

42. An electronic communication system as recited in claim 41 wherein the first token is shaped to indicate the nature of the first group database associated with the first token.

43. An electronic communication system as recited in claim 41 wherein the first token displays an illustration indicative of the nature of the first group database associated with the first token.

44. An electronic communication system as recited in claim 28 wherein the first token includes a feedback device operable to indicate whether the content of the first group database has changed since last displayed on the IDU.

45. An electronic communication system as recited in claim 28 wherein the first token is magnetic.

46. An electronic communication system as recited in claim 28 wherein the first token has a Velcro backing.

47. An electronic communication system as recited in claim 28 wherein the first input detection space is metallic in order to receive magnetic tokens.

48. An electronic communication system as recited in claim 28 wherein the first input detection space includes slots arranged to receive the tokens.

49. An electronic communication system as recited in claim 28 wherein the first input detection space can simultaneously receive and detect multiple tokens.

50. An electronic communication system as recited in claim 28 wherein the first note data input device is a touch sensitive overlay covering the first display screen.

51. An electronic communication system as recited in claim 28 wherein the first note data input device is a keyboard.

52. A computer implemented method for providing a shared persistent data space to a plurality of input/display units (IDUs), the method comprising:
   receiving a token within a detection space of an IDU;
   determining a group associated with the token;
   providing the IDU content from a group database belonging to the group associated with the token;
   displaying at the IDU a representation of the content from the group database;
   receiving input data at the IDU intended to be added to the content from the group database; and
   updating the group database to reflect the received input data.

53. A computer implemented method as recited in claim 52 further including the step of providing indicative feedback to a user of an IDU whenever content of the shared persistent data space has changed.

54. A computer implemented method as recited in claim 52 further including the step of allowing a user to adjust the displayed position of a note associated with a displayed group.

55. A computer implemented method as recited in claim 52 further including the step of allowing a user to delete a note associated with a displayed group.

56. A computer implemented method as recited in claim 52 further including the step of allowing a user to mark a note so that it may not be deleted.

57. A computer implemented method as recited in claim 52 further including the step of allowing a user to zoom in on a particular displayed note thereby increasing the magnification level of the particular displayed note.

58. A computer implemented method as recited in claim 52, wherein the step of determining a group associated with the token includes the acts of:
   sensing a group identifier within the token received at the detection space of the IDU;
   transmitting the group identifier to a server computer system, the transmission via a bi-directional communications medium; and
   receiving the group identifier at the server computer system and accessing the indicated group database stored in persistent memory on the server computer system.

59. A computer implemented method as recited in claim 52 wherein the step of providing the IDU content from a group database belonging to the group associated with the token includes the act of, after accessing a group database associated with the determined group, transmitting content from the group database to the IDU.

60. A computer implemented method as recited in claim 52 wherein the step of receiving input data at the IDU includes the act of scanning in a document.

61. A computer implemented method as recited in claim 60 wherein the set of scannable documents includes photographs and handwritten notes.

62. A computer implemented method as recited in claim 60 wherein the group database consists of notes that each represent a document generated by the step of receiving input data through the act of scanning in a document.

63. A computer implemented method as recited in claim 52 wherein the step of receiving input data at the IDU intended to be added to the content from the group database includes the act of writing with digital ink on a digitizing device.

64. A computer implemented method as recited in claim 63 wherein the inked data includes text and drawings.

65. A computer implemented method as recited in claim 52 wherein the step of receiving input data at the IDU intended to be added to the content from the group database includes the act of receiving binary signals from a keyboard or keyboard-like input device.

66. A computer implemented method as recited in claim 52 wherein the step of receiving input data at the IDU intended to be added to the content from the group database includes the act of receiving a communication from a separate computer system.

67. A computer implemented method as recited in claim 66 wherein the separate computer system is located remotely with respect to the IDU.

68. A computer implemented method as recited in claim 52 further including the step of providing indicative LED feedback to a user of an IDU whenever content of the shared persistent data space has changed.

69. A computer implemented method for maintaining an electronic database and providing access to a client of the electronic database, the computer implemented method comprising the steps of:

provided a input/display unit (IDU) to a user of the electronic database, the IDU including a display screen, a scanning device, and a note control input device;

receiving through the scanning device a plurality of discrete notes, each discrete note being the result of a single scanning operation;

storing the plurality of discrete notes within the electronic database;

displaying at least one of the plurality of notes upon the display screen; and allowing the user to interactively manipulate and organize the stored plurality of notes utilizing the IDU.

70. A computer implemented method as recited in claim 69 further including the step of allowing a user to adjust the displayed position of a note associated with a displayed group.

71. A computer implemented method as recited in claim 69 further including the step of allowing a user to delete a note associated with a displayed group.

72. A computer implemented method as recited in claim 69 further including the step of allowing a user to mark a note so that it may not be deleted.

73. A computer implemented method as recited in claim 69 further including the step of allowing a user to zoom in on a particular displayed note thereby increasing the magnification level of the particular displayed note.

* * * * *